United States Patent
Nishikawa et al.

(10) Patent No.: US 7,344,663 B2
(45) Date of Patent: Mar. 18, 2008

(54) MULTI-NOZZLE FOR GRANULATION AND METHOD FOR MANUFACTURING GRANULAR PRODUCT

(75) Inventors: Genshi Nishikawa, Chiba (JP); Eiji Sakata, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 11/639,106

(22) Filed: Dec. 14, 2006

(65) Prior Publication Data

US 2007/0148325 A1    Jun. 28, 2007

(30) Foreign Application Priority Data

Dec. 22, 2005  (JP) .............................. 2005-369069

(51) Int. Cl.
*B29B 9/00*  (2006.01)
(52) U.S. Cl. ............. 264/7; 264/14; 425/6; 23/313 FB; 239/567; 118/303
(58) Field of Classification Search .................... None
See application file for complete search history.

(56) References Cited

U.S. PATENT DOCUMENTS

| | | | |
|---|---|---|---|
| 1,529,531 A | * | 3/1925 | Young ........................ 239/491 |
| 3,303,103 A | | 2/1967 | Schmidt et al. |
| 4,749,595 A | | 6/1988 | Honda et al. |
| 5,964,901 A | * | 10/1999 | Kido et al. ............. 23/313 FB |
| 6,203,730 B1 | * | 3/2001 | Honda et al. .................. 264/7 |
| 2005/0067509 A1 | * | 3/2005 | Redaelli ..................... 239/548 |

FOREIGN PATENT DOCUMENTS

| | | |
|---|---|---|
| JP | 56-47181 | 11/1981 |
| JP | 4-63729 | 10/1992 |
| JP | 10-216499 | 8/1998 |

* cited by examiner

*Primary Examiner*—Mary Lynn Theisen
(74) *Attorney, Agent, or Firm*—Flynn, Thiel, Boutell & Tanis, P.C.

(57) ABSTRACT

The present invention provides a granulation method with increased drying effect while assuring the pressure for spraying the aqueous solution and the necessary number of nozzles equivalent to those of conventional design. Specifically, the granulation method uses a granulator structured by a fluid bed which fluidizes the granulating-particles, an air feed pipe to introduce air, a nozzle for spraying the raw material aqueous solution being located at center part of the air feed pipe, and a perforated plate to feed a fluidization air to the fluid bed, thus granulating the raw material aqueous solution by spraying thereof from the nozzle into a granulation part, wherein a multi-nozzle in a specified shape having a plurality of nozzle ends thereon is used as the nozzle for spraying the raw material aqueous solution.

3 Claims, 2 Drawing Sheets

(a)　　　　　　　　(b)

MULTI-NOZZLE FOR GRANULATION AND METHOD FOR MANUFACTURING GRANULAR PRODUCT

TECHNICAL FIELD

The present invention relates to an improved technology of granulation method which uses a spout-fluid granulator to manufacture granules from a raw material aqueous solution such as urea aqueous solution and ammonium sulfate aqueous solution, and specifically relates to an improvement in the nozzle for spraying the raw material aqueous solution. The description given below focuses on the granulation of urea as a typical example of the granulation of an aqueous solution thereof.

BACKGROUND ART

Methods for manufacturing relatively coarse granular urea once adopted the one using a drum and the one using a pan granulator. Those methods, however, have drawbacks that once-granulated urea has to be recycled to the granulator after cooling the granular urea in order to release the urea-solidification heat generated during granulation to operate the process under a suitable condition of internal temperature of the granulator for the granulation, that a large apparatus is necessary for establishing the recycling, that there is a limitation of production capacity per single unit of granulator, which requires a plurality of granulators at recent industrial scale, and that the urea being sprayed into the granulator is a molten urea having equal water content to that of the product urea.

As a result, recently, the granulation method is principally fluid bed one or spout-fluid bed one. As of these granulation methods, varieties of technologies have been proposed, (refer to JP-B 4-63729 and JP-A 10-216499).

When a granulator of the above spout-fluid bed type is applied for granulating a urea aqueous solution, granulation, drying and cooling simultaneously proceed in the granulator. During the above operation, it is known that smaller droplets of aqueous solution being sprayed against the particles as nuclei give larger drying effect.

With a single-fluid nozzle which deals only with liquid, an applicable method for decreasing the droplet size may be the one to increase the spraying pressure of the aqueous solution, and the one to decrease the throughput per single nozzle from which the aqueous solution is sprayed. To increase the pressure for spraying the aqueous solution, however, the apparatus for increasing the pressure becomes large. In addition, if the throughput per single nozzle is decreased, the number of nozzles arranged in the granulator has to be increased, which increases the size of the granulator to accept these nozzles, and increases the air rate to form the spout-fluid bed, thereby increasing the operating cost.

According to the design of the related art, generally the design of nozzle is conducted under the condition of the spraying pressure of aqueous solution in a range from 0.6 to 1.2 MPa and the throughput per single nozzle in a range from 0.6 to 2.0 ton/hr to achieve the optimum design as the granulator. As a result, a nozzle according to the related art has a limitation of the droplet size of 300 μm at the minimum.

According to JP-B-56-47181, there is proposed the adoption of an atomizing nozzle which accepts high pressure air for spraying the aqueous solution to mix the air with the aqueous solution before spraying the aqueous solution, thus forming very fine aqueous solution particles to conduct granulation with an improved drying effect. Since, however, the method needs to increase the air pressure, generally up to 1 to 2 bar, the method has a problem of increase in the power for pressurizing the air, which increases the operating cost.

DISCLOSURE OF THE INVENTION

The present invention provides a granulation method which forms fine aqueous particles without introducing high pressure air to a nozzle for spraying the aqueous solution while assuring the pressure for spraying the aqueous solution and the necessary number of nozzles equivalent to those of conventional design, thus increasing the drying effect without changing the structure of the granulator of spout-fluid bed type.

The inventors of the present invention conducted detail studies to establish the above method, and found that the formation of finer aqueous particles than those in the related art is available while assuring the pressure for spraying the aqueous solution and the throughput per single nozzle equivalent to those of conventional design by applying a multi-nozzle mounted to a single nozzle, which multi-nozzle is structured by arranging a plurality of spray nozzle ends that can form fine aqueous particles at a small throughput per single nozzle end. Thus, the inventors of the present invention have perfected the present invention.

That is, the present invention provides a multi-nozzle as a nozzle for spraying a raw material aqueous solution, being applied to a granulation method to manufacture granules from the raw material aqueous solution using a granulator of spout-fluid bed type, wherein:

(1) two to six nozzle ends in a shape of triangular cone convexed upward are arranged radially on a body in a shape of triangular cone convexed upward at an equal spacing therebetween;

(2) the spraying angle of each nozzle end is in a range from 15° to 45°, and the spraying angle of the whole multi-nozzle is in a range from 30° to 60°; and (3) the throughput of the multi-nozzle is in a range from 0.6 to 2.0 t/hr, and the throughput of each nozzle end being in a range from 0.1 to 0.4 t/hr.

In other words, the multi-nozzle of the invention is used to spray an aqueous solution of a raw material in a method of manufacturing granules from the aqueous solution of the raw material with a granulator of spout-fluid bed type, meeting the above shown requirements (1), (2) and (3).

Furthermore, the present invention provides a method for manufacturing granular product using a granulator structured by a fluid bed which fluidizes granulating-particles, air feed pipes to introduce spouting air, a nozzle for spraying a raw material aqueous solution being located at center part of the air feed pipe, and a perforated plate to feed a fluidization air to the fluid bed, thus granulating the raw material aqueous solution by spraying thereof from the nozzle into a granulation part, wherein the nozzle is a multi-nozzle in which:

(1) two to six nozzle ends in a shape of triangular cone convexed upward are arranged radially on a body in a shape of triangular cone convexed upward at an equal spacing therebetween;

(2) the spraying angle of each nozzle end is in a range from 15° to 45°, and the spraying angle of the whole multi-nozzle is in a range from 30° to 60°; and (3) the throughput of the multi-nozzle is in a range from 0.6 to 2.0 t/hr, and the throughput of each nozzle end is in a range from 0.1 to 0.4 t/hr.

Furthermore, the present invention provides use of the above-mentioned nozzle for the above-mentioned granulation.

BRIEF DESCRIPTION OF DRAWINGS

FIG. 1(a) is the plan view thereof, and FIG. 1(b) is the front view thereof. The code 300 means a multi-nozzle, 301 means the body in a triangular cone shape and 302 means the nozzle end in a triangular cone shape.

DETAIL DESCRIPTION OF THE INVENTION

The present invention allows formation of finer aqueous particles than those in the related art, thus improving the drying effect in the granulator. Furthermore, according to the present invention, there is no need of changing the structure of the granulator, and there is attained further small design thereof with decreased operating cost. In addition, the granular product of urea, ammonia sulfate, and the like manufactured by the present invention improves the shape, decreases the water content, and increases the particle loading strength not to allow easy breaking.

Figure 3:
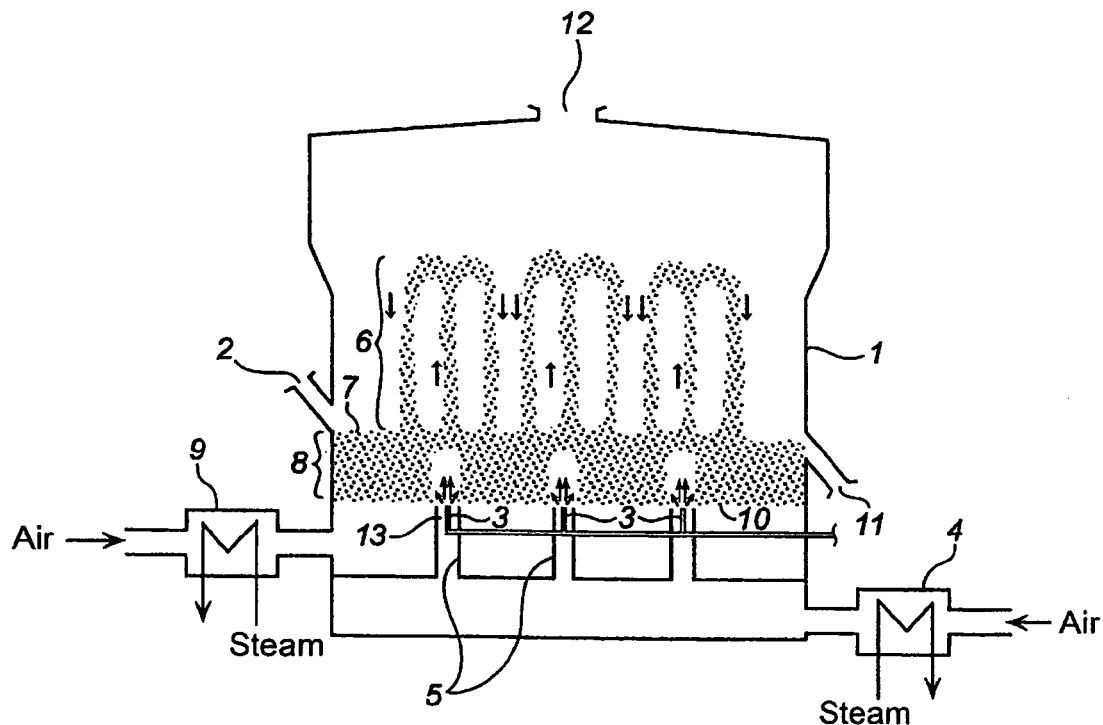
FIG. 3 shows a cross sectional view of an embodiment of the granulator of spout-fluid bed type, adopted as an example of the present invention. The code 1 designates a granulator, 2; a feed port of the seed particles, 3; the nozzle, 4; an air heater for a spouting bed, 5; an air feed pipe, 6; a space, 7; an upper part of a fluid bed, 8; the fluid bed, 9; an air heater for the fluid bed, 10; a bed bottom, 11; a discharge port for the granules, 12; a vent port, and 13; an upper part of the air feed pipe.

The present invention is described in detail referring to the drawings. The description begins with a brief description about the method for manufacturing granules using the spout-fluid bed type granulator to which the present invention is applied. FIG. 3 shows a cross sectional view of an example of the spout-fluid bed type granulator having a combined structure of a currently and generally using fluid bed with a spouting bed.

To the granulator 1, the seed particles of urea being granulated are fed from the feed port 2. The urea solution is sprayed into the granulator 1 from the nozzle 3 for spraying the raw material aqueous solution, (spray nozzle), located at the upper vent 13 of the air feed pipe 5 for the spouting bed. The seed particles increase their size in the granulator 1 under the spraying of the urea solution, which are then heated in the air heater 4 for the spouting bed. The heated seed particles enter the lower part of the granulator, and jump up into the space 6 carried by the respective air flows for spouting branched by the plurality of air feed pipes 5, and then again drop to the top of the upper part 7 of the fluid bed. Since the air for the fluid bed is fed to the granulator 1 via the air heater 9 for the fluid bed, the granular urea grown on the bed bottom 10 is fluidized in the fluid bed 8, and the granular urea is fluidized to fill the whole space above the nozzle 3. That type of movement is repeated to gradually increase the size of the granular urea, and finally the granular urea which completed the granulation is discharged from the discharge port 11.

Figure 4:
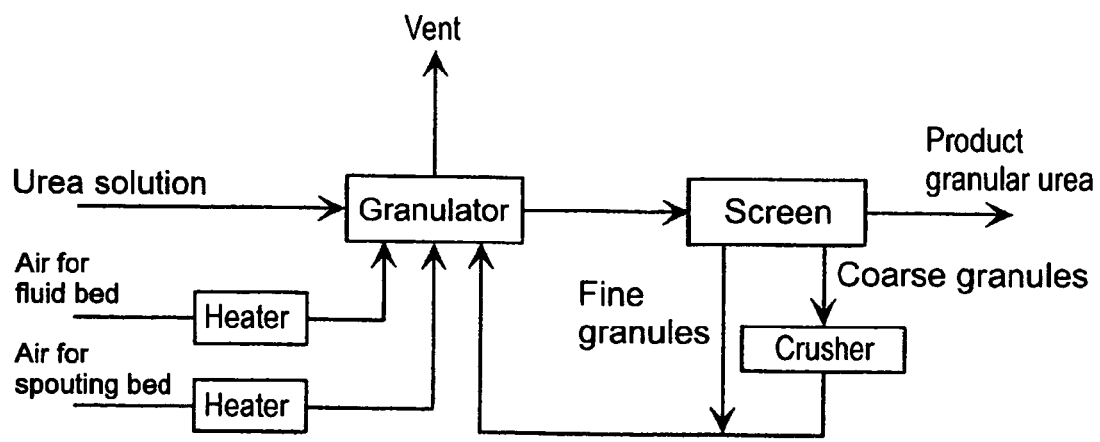
FIG. 4 shows a general flow diagram for manufacturing granular urea using the granulator.

FIG. 4 shows a flow diagram for manufacturing granular urea using the spout-fluid bed type granulator.

In the method for manufacturing granular product using the above granulator of spout-fluid bed type, a main part of the present invention is to use a specified multi-nozzle 300 as the nozzle 3, while other conditions of apparatus, operation, and the like may be the same as those of the granulator in the related art.

Figure 1:
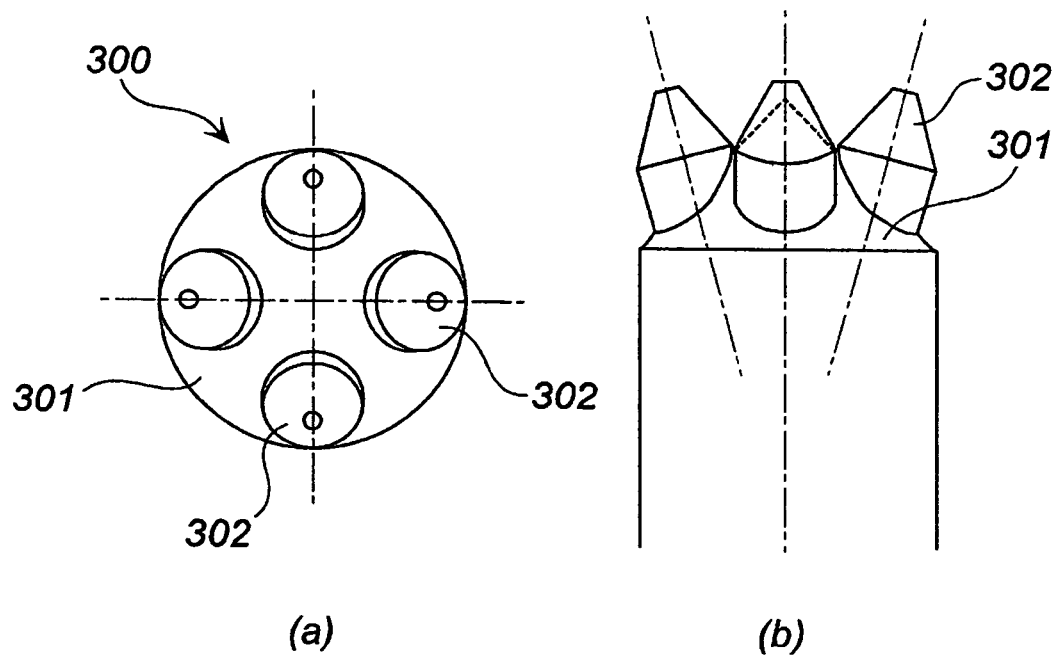
FIG. 1 shows the shape of the multi-nozzle according to the present invention.

FIG. 1 shows the shape of the multi-nozzle according to the present invention. FIG. 1(a) is the plan view thereof, and FIG. 1(b) is the front view thereof.

Figure 2:
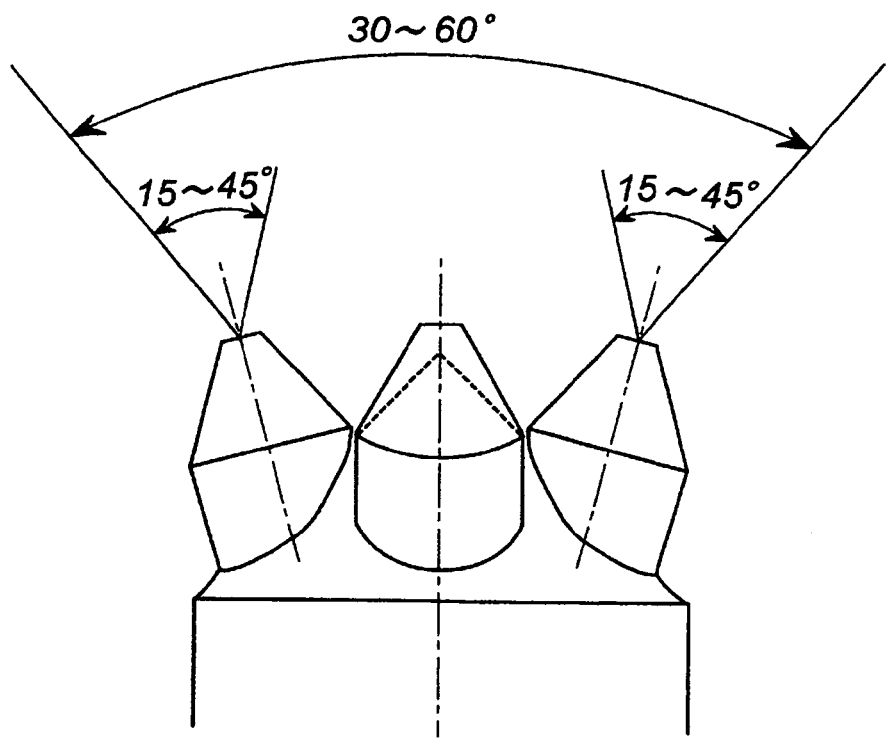
FIG. 2 shows the spraying angle of the multi-nozzle according to the present invention.

The multi-nozzle 300 according to the present invention has two to six nozzle ends 302 in a shape of triangular cone convexed upward arranged radially on the body 301 in a shape of triangular cone convexed upward at an equal spacing therebetween, (FIG. 1 and FIG. 2 show an example of arranging four nozzle ends). The number of nozzle ends is in a range from 2 to 6. Although the number thereof may be 7 or more, that increased number raises a problem of difficulty in manufacturing, and of increased interference of droplets between nozzle ends. Accordingly, a practical number thereof is up to 6, and in a range from 3 to 4 is preferable in view of efficiency.

The shape of the body 301 and of the nozzle end 302 is formed in a triangular cone shape convexed upward because of the prevention of plugging of nozzle resulting from depositing the fluidizing urea particles on the spray nozzle. The term "triangular cone shape" referred to herein includes a resembling shape with a shape modification to some extent.

The nozzle ends 302 are arranged at an equal spacing avoiding interference of sprayed droplets between nozzle ends, and are positioned radially on the body 301 in a triangular cone shape with a slight inclination to the axis of the body 301. The term "an equal spacing" referred to herein does not necessarily mean strictly the same spacing with each other, and a deign change to some extent is allowable if the droplets sprayed from the respective nozzle ends do not interfere with each other. The inclination angle (protrusion angle) is determined to satisfy the following given spraying angle.

That is, according to the multi-nozzle of the present invention, as shown in FIG. 2, it is necessary that the spraying angle of each nozzle end is in a range from 15° to 45°, and that the spraying angle as the whole nozzle is in a range from 30° to 60°. Unless the spraying angle of each nozzle end is in a range from 15° to 45°, the interference between the droplets sprayed from the nozzle ends 302 becomes large, which fails to attain good product.

From the point to form finer aqueous particles than those in the related art without decreasing the throughput per single nozzle, which is an object of the present invention, it is necessary to establish the throughput per single multi-nozzle in a range from 0.6 to 2.0 t/hr, and the throughput per individual nozzle end in a range from 0.1 to 0.4 t/hr.

There is no specific limitation on the nozzle opening diameter, nozzle length, and the like, and they may be similar to those in the conventional nozzles if only they satisfy the above throughput.

Generally, important items of the product quality of granular urea are total nitrogen, biuret as an impurity, and water content. As for the water content, generally 0.3% or less by weight is a standard and design value of the urea product at the time of shipment from the urea plant. Although some of the urea products of 0.3% by weight or more of water content are delivered to the market, the water content is preferably as low as possible because a high water content of the urea product decreases the hardness of the product and significantly increases wearing of the urea product contained in apparatuses handling the product. Urea dust will be generated in an increased amount. Moreover it induces wetting of the surface of the urea product during storage in warehouse by evaporating the water and by condensing the water vapor in a cold external atmosphere, thus agglomerating the urea particles to form coarse lumps, thereby failing to ship the urea granules as the product. Particularly when the granular urea product granulated using a fluid bed is handled, the water content is preferably regulated to 0.3% or less by weight.

Since the granulator utilizing the fluid bed has a drying effect, the urea aqueous solution as the raw material is often prepared to 94 to 95% by weight or higher urea concentration. In some granulators, however, the product manufactured from the raw material with 94 to 95% by weight of urea concentration gives 0.3% by weight or more of water content. In that case, the concentration of raw material urea aqueous solution has to be increased from the level in a range from 94 to 95% by weight to the level in a range from 98 to 99.7% by weight, thus to keep the water content in the product to 0.3% or less by weight with the aid of drying effect. The heat generated during the agglomeration of the urea particles is removed by the air fed to the granulator and by the vaporization heat of water in the urea aqueous solution. If, however, the concentration of the urea aqueous solution increases, the vaporization heat of water becomes small, and the volume of cooling air increases, which increases the blower capacity, and increases the power consumption for granulation, thus increasing the production cost. Therefore, the increase in the concentration of urea aqueous solution is not preferable.

The solidification heat of urea is removed by air in the fluid bed. Since, however, the temperature of agglomeration of the urea particles is about 132° C., an excessively low temperature in the granulator enhances the agglomeration of the urea particles at their surface, thus the sprayed urea acts as the binder to form granular urea lumps resembling so-called popcorn (adhered urea particles with each other), which is unfavorable. Since the urea particles discharged from the granulator are cooled, the operation is often conducted at a low temperature in a range of not-inducing the above problems, or in a range from 95° C. to 105° C. On the other hand, for the operation at high temperatures, the temperature of fluid bed is not raised to higher than the above-described level because a temperature too close to the agglomeration temperature may fail to attain good granulation of urea in the granulator.

With the granulation method to manufacture granular urea from an urea aqueous solution using a granulator of spout-fluid bed type, a granular urea product having water content of 0.3% or less by weight can be manufactured by using an urea aqueous solution of 94 to 98.5% by weight of urea concentration and by controlling the operating temperature of the fluid bed in a range from 110° C. to 120° C., thus enhancing the drying of the granulating-particles. If, however, the multi-nozzle according to the present invention is applied to the manufacturing method, the granular urea product having further low water content is efficiently manufactured, and further the concentration of the raw material urea aqueous solution can be decreased to 90% by weight.

Regarding the method for manufacturing granular product, the raw material aqueous solution is preferably a urea aqueous solution of 90% by weight or more of urea concentration.

EXAMPLES

The present invention is described in more detail in the following referring to Examples. However, it is needless to say that the present invention is not limited to these Examples.

Reference Example 1

Using the spout-fluid bed type granulator shown in FIG. 3, granular urea is manufactured at a rate of 41.7 ton/hr. The flow diagram is shown in FIG. 4.

There were arranged 48 air feed pipes. For each of these air feed pipes, the spray nozzle 3 (ordinary nozzle having one nozzle end thereon) for spraying the raw material urea solution was mounted to the upper portion thereof. The seed particles were fed from the feed port 2 for beginning the operation. Then the urea aqueous solution (95% by weight concentration) was sprayed from each spray nozzle at a rate of 0.943 ton/hr, or 45.26 ton/hr as the total of the granulator to manufacture the granular urea. At that time, air at 35° C. was fed to the fluid bed at 95, 800 $Nm^3$/hr at an air velocity of 2 m/sec. On the other hand, to the 48 air feed pipes, there was fed an air heated in the air heater 4 for the spouting bed to 130° C. in the total amount of 25,700 $Nm^3$/hour in the 48 pipes. The granular urea discharged from the discharge port 11 of the granulator was cooled to 90° C., which was then classified by a screen to collect the granular urea product having sizes from 2 to 4 mm. The collected granular urea was cooled to 50° C., which was then sent to a warehouse as the product. As of the residual product, the coarse granular urea product was cooled to 70° C. and then was pulverized by a crusher, which was then recycled to the granulator as the seed particles together with the not-cooled fine granular urea product. During the operation, the temperature of the fluid bed 8 was 104° C. From the discharge port 11 of the granulator, the granular urea was discharged in an amount of 68.85 ton/hr at 105° C., and the urea product having sizes from 2 to 4 mm was obtained through the screen at a rate of 41.7 ton/hr. Thus obtained urea product was sent to the warehouse. On the other hand, the granular urea separated by the screen at a rate of 27.15 ton/hr was recycled to the granulator as the seed particles, as described above.

The urea of the difference quantity between the sum of (the seed particles recycled to the granulator at a rate of 27.15 ton/hr and the urea in the raw material urea aqueous solution) and the quantity of the granular urea discharged from the granulator was discharged from the upper air vent port of the granulator 1 as dust together with the air for the fluid bed, the air for the spouting bed, and the water vaporized during granulation of the urea. The vent gas containing the urea dust was washed by the circulating liquid in a vent gas washing tower, and the urea was collected as the urea aqueous solution to recycle to the urea plant. The water content of the product was in the range from 0.35 to 0.4% by weight, and the loading strength of the granular urea of 3 mm in diameter was in the range from 2.5 to 3 kg.

Reference Example 2

In the above operating conditions, the air for the fluid bed was heated to gradually raise the temperature of the fluid bed. At above 110° C. of the fluid bed temperature, the water content of the product decreased to 0.3% by weight or lower level. The air for the fluid bed was further heated to 55° C.

to raise the temperature of the fluid bed to 115° C. As a result, the water content of the obtained granular urea decreased to a level ranging from 0.2 to 0.25% by weight, and the loading strength of the granular urea of 3 mm in diameter size increased to a level ranging from 3.5 to 4 kg.

Example 1

The granular urea was manufactured applying the same procedure to that of Reference Example 1 except that the multi-nozzle of the present invention, shown in FIG. 1, was used as the nozzle.

Reference Example 1 gave the average droplet size of 300 µm for the raw material urea solution sprayed from the nozzle. However, the multi-nozzle according to the present invention gave 200 µm of the average droplet size.

The water content of thus obtained product was in the range from 0.25 to 0.3% by weight, and the loading strength of the granular urea of 3 mm in diameter size was in the range from 3.3 to 3.8 kg.

Example 2

The granular urea was manufactured applying the same procedure to that of Reference Example 2 except that the multi-nozzle of the present invention, shown in FIG. 1, was used as the nozzle.

Reference Example 2 gave the average droplet size of 300 µm for the raw material urea solution sprayed from the nozzle. However, the multi-nozzle according to the present invention gave 200 µm of the average droplet size.

The water content of thus obtained product was in the range from 0.15 to 0.2% by weight, and the loading strength of the granular urea of 3 mm in diameter size was in the range from 3.8 to 4.3 kg.

The invention claimed is:

1. A multi-nozzle as a nozzle for spraying a raw material aqueous solution, being applied to a granulation method to manufacture granules from the raw material aqueous solution using a granulator of spout-fluid bed type, wherein:

(1) two to six nozzle ends in a shape of triangular cone convexed upward are arranged radially on a body in a shape of triangular cone convexed upward at an equal spacing therebetween;

(2) spraying angle of each nozzle end is in a range from 15° to 45°, and spraying angle of the whole multi-nozzle is in a range from 30° to 60°; and (3) throughput of the multi-nozzle is in a range from 0.6 to 2.0 t/hr, and throughput of each nozzle end is in a range from 0.1 to 0.4 t/hr.

2. A method for manufacturing a granular product comprising the steps of providing a granulator structured by a fluid bed which fluidizes granulating-particles, an air feed pipe to introduce air, a nozzle for spraying a raw material aqueous solution located at a center part of the air feed pipe, and a perforated plate to feed fluidization air to the fluid bed, and granulating the raw material aqueous solution by spraying the raw material aqueous solution from the nozzle for spraying the raw material aqueous solution into a granulation part, wherein the nozzle for spraying the raw material aqueous solution is a multi-nozzle in which:

(1) two to six nozzle ends in a shape of triangular cone convexed upward are arranged radially on a body in a shape of triangular cone convexed upward at an equal spacing therebetween;

(2) a spraying angle of each nozzle end is in a range from 15° to 45°, and a spraying angle of the whole multi-nozzle is in a range from 30° to 60°; and (3) a throughput of the multi-nozzle is in a range from 0.6 to 2.0 t/hr, and a throughput of each nozzle end is in a range from 0.1 to 0.4 t/hr.

3. The method for manufacturing granular product according to claim 2, wherein the raw material aqueous solution is a urea aqueous solution having 90% by weight or more of urea concentration.

* * * * *